United States Patent [19]
Walsh

[11] 3,723,952
[45] Mar. 27, 1973

[54] APPARATUS FOR DIFFERENTIATING BETWEEN SIDE LOBE AND MAIN LOBE RETURNS IN DEPTH SOUNDING SYSTEMS

[75] Inventor: George M. Walsh, Middletown, R.I.

[73] Assignee: Raytheon Company, Lexington, Mass.

[22] Filed: May 26, 1970

[21] Appl. No.: 41,700

Related U.S. Application Data

[63] Continuation of Ser. No. 754,659, Aug. 22, 1968, abandoned.

[52] U.S. Cl. ............. 340/3 R, 340/6 R, 343/100 CL, 343/100 LE
[51] Int. Cl. ............................................. G01s 9/68
[58] Field of Search ..340/3 R, 6 R, 3 PS, 16 R, 16 P; 343/7 A, 100 CL, 100 LE

[56] References Cited

UNITED STATES PATENTS

| | | | |
|---|---|---|---|
| 3,349,394 | 10/1967 | Carver | 343/16 R |
| 2,990,544 | 6/1961 | LaRosa | 343/100 LE |
| 3,094,695 | 6/1963 | Jahn | 343/100 R |

FOREIGN PATENTS OR APPLICATIONS

| | | | |
|---|---|---|---|
| 946,839 | 1/1964 | Great Britain | 340/3 PS |

*Primary Examiner*—Richard A. Farley
*Attorney*—Harold A. Murphy and Joseph D. Pannone

[57] ABSTRACT

The apparatus includes means for acoustically illuminating the ocean bottom, and a receiving arrangement. The receiving arrangement comprises means for extracting an acoustic echo signal out of noise, and means for generating a signal magnitude proportional to the phase difference between echo signal arrivals at two spatially separated points. A logic arrangement gates through extracted echo signals when the phase difference signal magnitude is less than a predetermined quantity. This permits identification of the received echo returns in term of their angle of arrival. Consequently, all side lobe returns may be excluded. The apparatus further comprises means for measuring the time of arrival of gated through extracted acoustic signals in order to complete the depth sounding function.

9 Claims, 6 Drawing Figures

Patented March 27, 1973 3,723,952

INVENTOR
GEORGE M. WALSH
BY Robert Bruce Brodie
ATTORNEY

Patented March 27, 1973

INVENTOR
GEORGE M. WALSH
BY Robert Bruce Brodie
ATTORNEY

Patented March 27, 1973 3,723,952

INVENTOR
GEORGE M. WALSH
BY Robert Bruce Brodie
ATTORNEY

APPARATUS FOR DIFFERENTIATING BETWEEN SIDE LOBE AND MAIN LOBE RETURNS IN DEPTH SOUNDING SYSTEMS

This application is a continuation of application Ser. No. 754,659, filed Aug. 22, 1968 and now abandoned.

BACKGROUND OF THE INVENTION

This invention relates to depth sounders and, more particularly, to depth sounders which project an acoustic beam which may have side lobe responses in addition to main lobe response.

A depth sounder is a device for measuring the distance between the ocean surface and the ocean floor. This may be instrumented by any acoustic device which measures the time between an acoustic pulse transmission and receipt of an echo. Most operable systems transmit not only a main lobe but also side lobes. It is known that a narrow main lobe beam width will improve depth resolution. However, unless a transmission array were to be infinitely long, such a narrow beam main lobe would have also attendant side lobes. Ordinarily, there is a significant difference in signal strength between the main lobes and side lobes. Thus, if a planar surface normal to the depth sounder is being illuminated, then one may discriminate between a main lobe echo and a side lobe echo in terms of signal strength alone.

The reflection strength of the ocean bottom is a function of angle of inclination. Thus, a given sloping bottom may yield a reflection which may be stronger in terms of the side lobe than that of the main beam. Also, the time of arrival of the strongest signal may bear no relationship as to whether it is a side lobe or a main lobe. The signal decision based on the strongest received signal would cause depth measurement error if the strongest signal was in fact a side lobe.

It is accordingly an object of this invention to devise a depth sounder capable of discriminating between side lobe and main lobe acoustic echos. It is a related object of this invention to devise a depth sounder in which the discriminating apparatus will minimize delay in the signal processing.

SUMMARY OF THE INVENTION

The foregoing objects of this invention are satisfied in an embodiment in which the ocean bottom is acoustically illuminated by transmitting means. Also, a receiving arrangement is used in connection therewith which includes means for extracting acoustic echo signals out of noise; means for generating a signal magnitude proportional to the phase difference between echo signal arrivals at spatially separated points; means for gating through extracted acoustic echo signals when the phase difference signal magnitude is less than a predetermined quantity; and means for measuring the time of arrival of the gated through extracted acoustic signals.

In more particular terms an angle deviation indicator generates a signal magnitude proportional to the angular difference between the angle of arrival of an incident acoustic echo signal phase front and a predetermined normal. This then discriminates between main lobe echos which are normal to the receiving device and side lobes. Thus, only those signals which have an arrival angle within a predetermined range or value are used to activate the timing measurement means. This signal provides the discrimination between the side lobe and main lobe responses.

A split beam receiving array is utilized for reception. Each of the beams, termed half beams, is sufficiently wide in beam width to encompass several side lobes of the received beam. The split beam array also achieves the spatial separation between the phase centers of the two half beams.

DESCRIPTION OF THE PREFERRED EMBODIMENTS

Figure 1A:
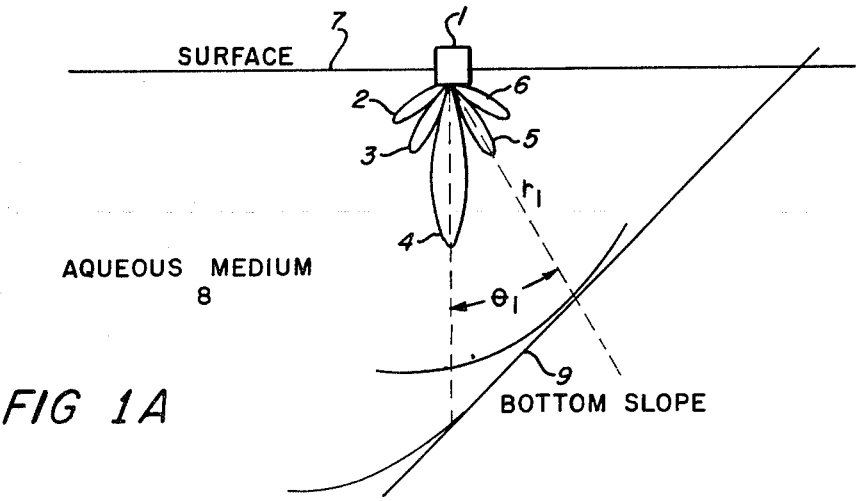
FIG. 1A shows a depth sounder having a main beam and side lobes in relation to a severely inclined ocean bottom slope.

The operating geometry of the system is shown in FIG. 1A. A model of the ocean bottom is shown to have a sloping region or bottom slope 9. A depth sounder transducer array 1 generates a main lobe 4 which illuminates the sloping region. Also generated are side lobes 2, 3, 5, and 6. The side lobes may illuminate the sloping regions at an incident angle more nearly perpendicular to the slope. The response of the array to the side lobes will be lower than the main lobe by a signal level which is a function of the size and the shading of the array. However, it is possible for the side lobe response to arrive at the receiver prior to the main lobe response if the slope of the bottom exceeds the bearing angle $\theta$ of the side lobe. For typical narrow beam systems the first side lobe 5 may occur at bearing angle $\theta$ as small as 10° which is well within the range of possible bottom slopes. Additionally, the reflectivity of the bottom (back scatter strength) is a function of the angle of incidence of an acoustic signal beam upon it. The back scatter strength is a maximum at normal incidence. Therefore, the side lobe response may exceed the main lobe response.

Present techniques for differentiating between the side lobe and main lobe responses depend on selecting the strongest signal arrival, independent of the time or order of arrival.

In this invention, side lobes are discriminated from main lobes by recognition of the bearing angle of the return signal at the time at which the echo signal return exceeds some minimum desired signal level.

Figure 1B:
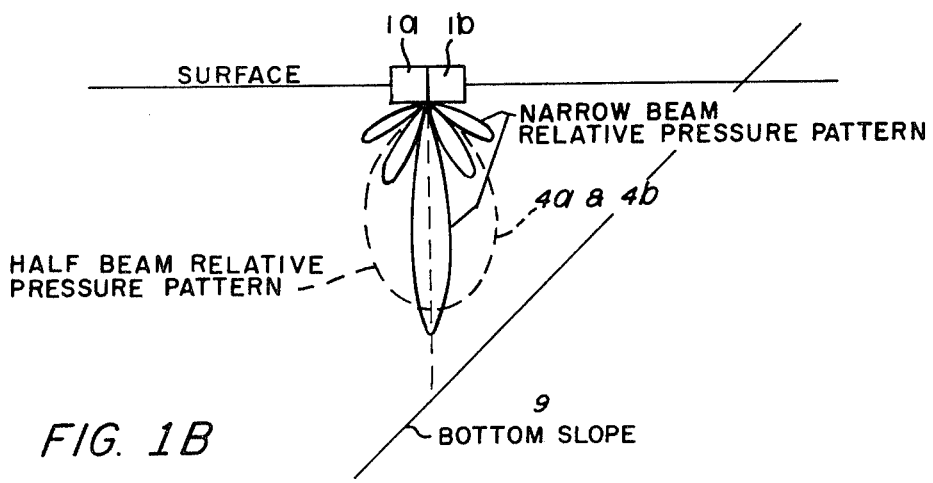
FIG. 1B shows a pair of half beams overlapping the main beam side lobes in relation to a severely inclined ocean bottom slope.
Figure 2:
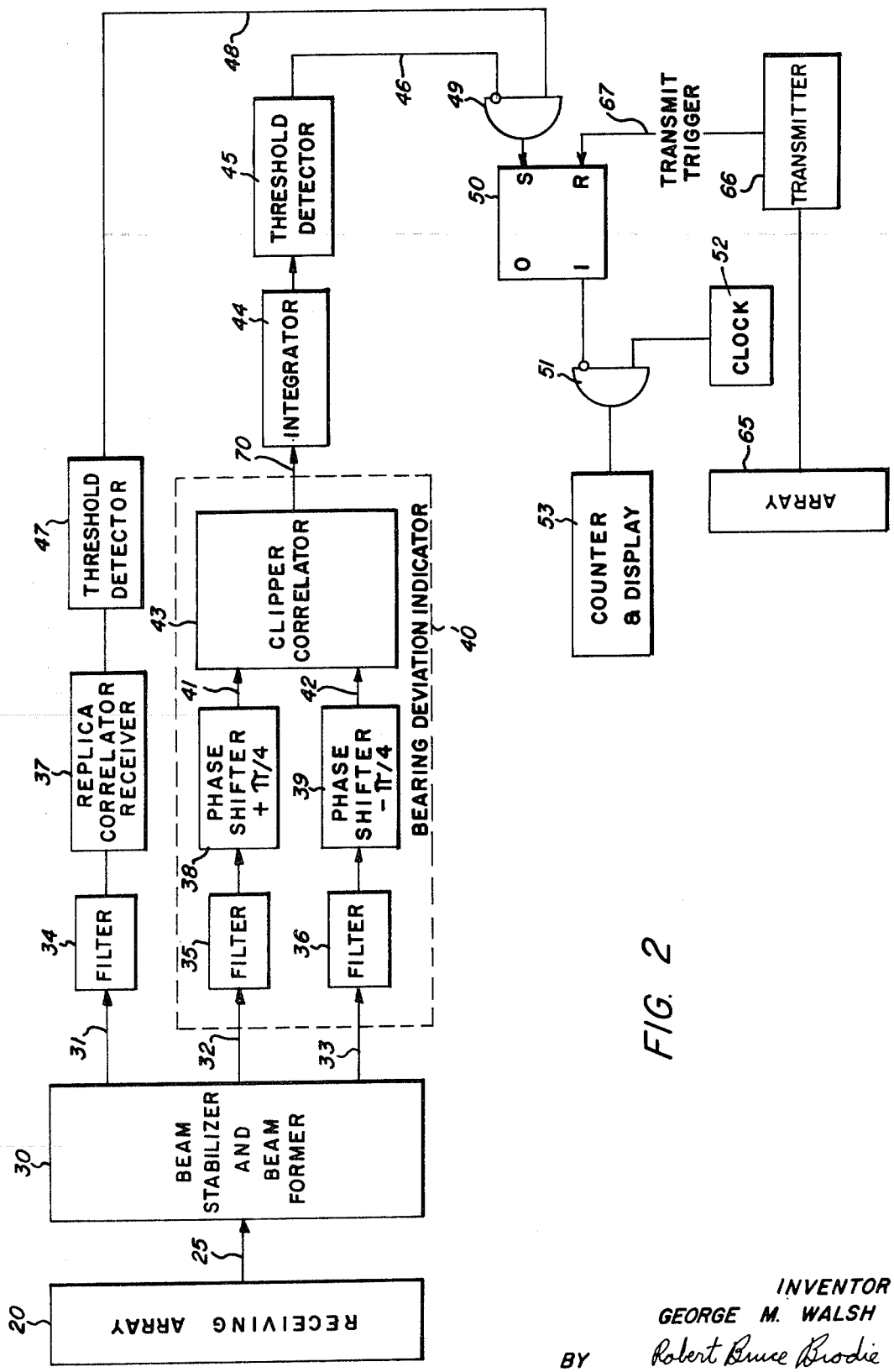
FIG. 2 is a block diagram representation of the depth sounder according to the invention.
Figure 3:
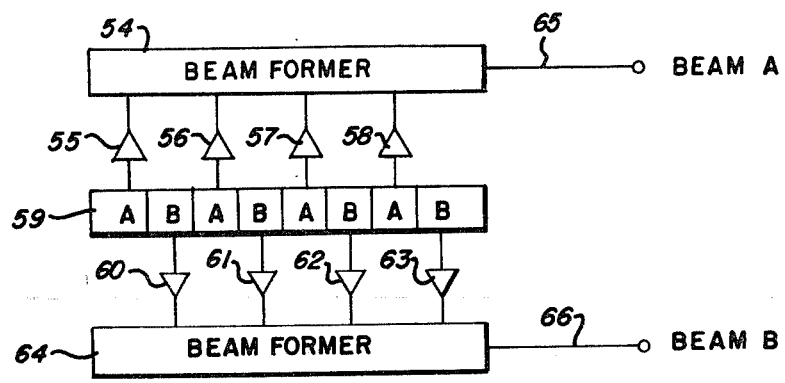
FIG. 3 shows a portion of the transmitting array for forming two beams.

A split beam receiving array is shown in FIG. 1B and FIG. 3. The split beam configuration is employed to provide a phase shift between the two halves of the receiving array. Relatedly, the phase of the signal outputs of the two half beams is proportional to the relative bearing angle of an incident echo signal. From this it is possible to generate a signal magnitude proportional to the phase difference between echo signal arrivals at two spatially separated points. A bearing deviation indicator 40 shown in FIG. 2 is used to measure this phase shift. In this regard, two or more combinations of bearing deviation indicators (BDI) and split beams may be employed to measure side lobes in two orthogonal directions. It is necessary to provide relatively high array gain of this split beam receiving array while maintaining close separation of the array phase centers.

Returning to FIG. 1B half beams 4a and 4b are shown generated in the particular context by beamforming elements 1a and 1b. The half beam spatial response patterns are essentially coincident such as to overlap several side lobes e.g., 2, 3, 5 and 6 of the narrow beam spatial response pattern. The half beam arrays may be partially overlapped. The phase center of such an overlapped array is in the order of an element spacing, although sufficient aperture is available for each beam to still be highly directive. The choice of the exact combination of elements and shading depends on the characteristics of the particular narrow beams depth sounder employed. The intent of the overlapping of the beams is to produce an output voltage from the corresponding BDI which contains no ambiguities in measurement of bearing angles over a range of bearings which include the first several side lobes of the narrow beam array.

FIG. 3 shows an embodiment of the receiving and transmitting array in which alternate acoustic energy elements A in array 59 drives beam former 54 through corresponding amplification elements 55 – 58. Likewise, signal elements B shape a beam in beam former 64 through amplification elements 60 – 63. No beam steering is shown for ease of description.

Because the bearing angle measurement is used to differentiate between side lobe and main lobe echo responses, attention is directed to the details of the instrumentation of the bearing deviation indicator. The bearing deviation indicator shown as element 40 in FIG. 2 generates a signal magnitude proportional to the angular difference between the angle of arrival of an incident acoustic echo signal phase front and a predetermined normal. In more direct terms, the signal magnitude is proportional to the phase difference between echo signal arrivals at two spatially separated points.

Bearing deviation indicator 40 comprises a correlator 43. Acoustic signals are applied to the correlator over a first and second path. The signal is applied over conductor 34 through filter 35 and phase shifter 38 on line 41 to clipper correlator 43. Likewise, the second input is applied on conductor 33 through filter 36 phase shifted by phase shifter 39 to a second input 42 to clipper correlator 43.

The clipper correlator generates a signal e which has a maximum amplitude E. It has been empirically determined that the signal e may be related to deviation angle $\theta$ by a relationship which includes received signal power magnitude S, noise power magnitude N, input bandwidth $\Delta f$, and arithmetic center frequency $f_0$.

The time delay between phase centers, that is, the time delay between signals appearing on conductors 32 and 33 is equal to $d/c \sin \theta$ where $d$ is the distance between the phase center half beams, $c$ is the velocity of sound and $\theta$ is the relative bearing angle to a predetermined normal.

With this introduction, the exact relationship between $e$ and $\theta$ is:

$$e = \frac{(2E)}{\pi} \sin^{-1} \frac{\left[ \left( \frac{S}{S+N} \right) \sin\left( \pi \Delta f \frac{d}{c} \sin \theta \right) \sin\left( 2\pi f_0 \frac{d \sin \theta}{c} \right) \right]}{\pi \Delta f \frac{d}{c} \sin \theta}$$

Figure 4A:
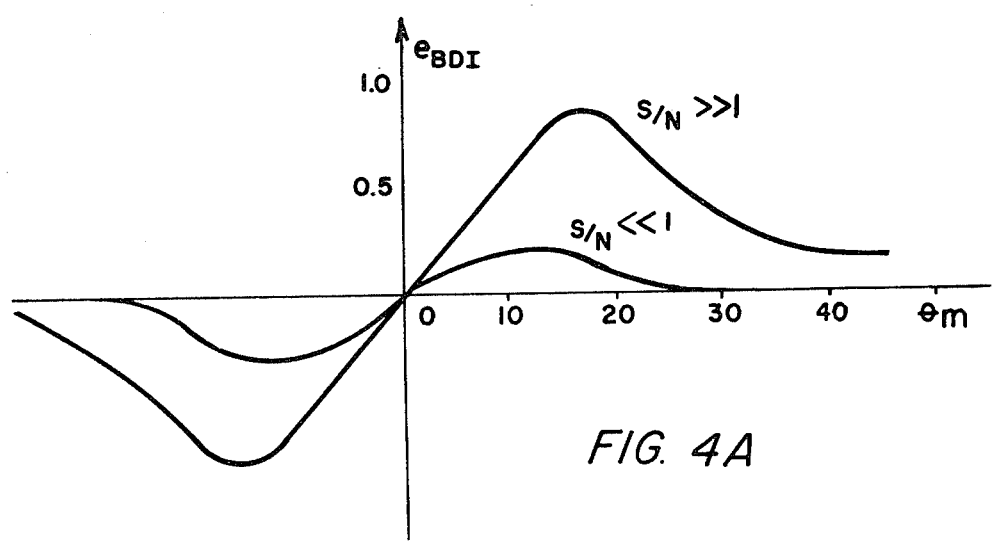
FIG. 4A shows the characteristic performance curve of the angle deviation indicator in terms of signal magnitude versus deviation angle.

FIG. 4A shows that the magnitude of the BDI output increases with the bearing angle $\theta$ where the signal-to-noise ratio $S/N$ is either greater than or less than 1. The difference in the curves represents the combination of the $S/S+N$ in the above equation and the effect of the half beam spatial response. At a high signal-to-noise ratio the normalizing action of the clippers tends to minimize the amplitude weighting of the beam pattern. At low $S/N$ the effective $S/N$ decreases off axis due to the beam pattern causing the BDI output to decrease very rapidly.

Figure 4B:
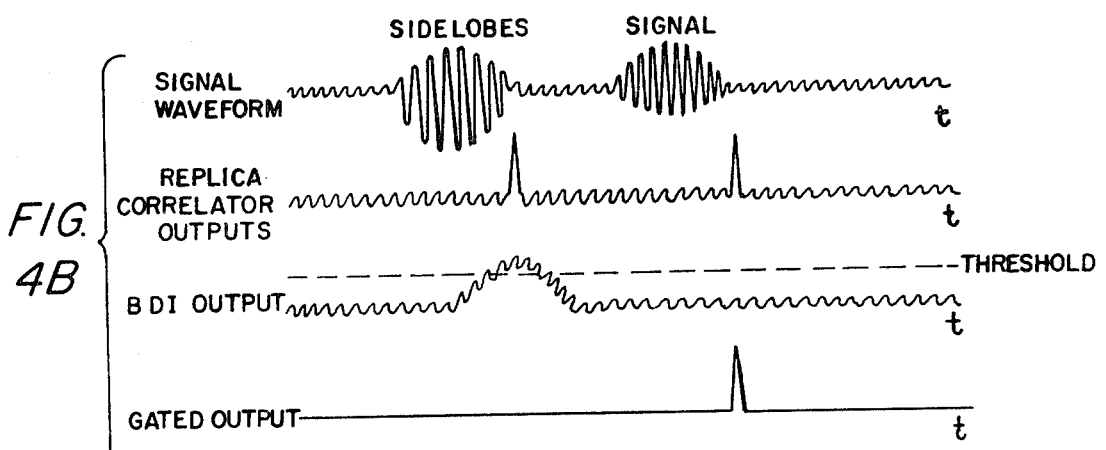
FIG. 4B is a graph of the signal waveform outputs at selected points in the receiving arrangement.

FIG. 2 is a block diagram of the depth sounder according to the invention. Receiving array 20 and array 65 may be either separate or the same array used for receiving and transmitting purposes. Receiver 20 is coupled to beam stabilizer and beam former unit 30 over conductors 25. The beam stabilizer and former unit may be constructed as is shown in FIGS. 4A and 4B of copending U. S. Pat. application No. 707,821, filed Feb. 23, 1968 entitled, "An Acoustic Mapping Apparatus" in the name of George M. Walsh, now U. S. Pat. No. 3,484,737.

The beam stabilizer and beam former 30 is coupled to filters 34, 35, and 36 over corresponding paths 31, 32, and 33. Each of the filters may be of the requisite bandpass type.

Filter 34, replica correlation receiver 37, and threshold detector 47 broadly form means for extracting a received acoustic signal out of noise. Replica correlation receiver 37 is broadly in the nature of an auto or cross-correlation receiver and may be constructed according to copending U. S. Pat. application No. 695,257, filed on Jan. 2, 1968 entitled, "A Waveform Regenerator For Use With A Digital Correlator" in the name of George M. Walsh and Mark A. Chramiec, now U. S. Pat. No. 3,665,413.

A signal magnitude proportional to the angular difference between an arriving signal phase front and a predetermined normal is applied upon conductor 70 to integrator 44 which acts as a low pass filter. This, in turn, is applied to a threshold detector 45. An inhibit gate logically passes a signal applied to the gate when no signal is present on its inhibit input. In this connection, inhibit gate 49 terminates the BDI output through threshold detector 45 at its inhibit input over path 46. The signal extraction means are terminated at the ordinary gate 49 input over path 48. Accordingly, the signal appearing on path 48 will be gated through gate 49 as long as no signal is present on inhibit input 46.

Attention is now directed to the fact that the BDI output signal approximates zero or a low value for small deviation angles about the normal. In contrast, a high magnitude signal appears for substantial deviation angles. Obviously, the setting of a threshold will in effect broaden the range of angle deviations about the normal that will be considered normal for signal purposes.

Transmitter 66 is coupled to array 65. It is also coupled to one input of flip flop 50. The output of inhibit gate 49 is coupled to a second input of flip flop 50. Inhibit gate 51 interconnects a clock 52 to a utilization device 53. Each time transmitter 66 sends out a pulse through array 65, flip flop 50 is set in one stable state. This inhibits clock 52 from driving utilization circuit 53 because the inhibit input of inhibit gate 51 is activated. When a main lobe response is extracted and impressed upon conductor 48 and is gated through inhibit gate 59, then flip flop 50 is set into another stable state. This removes the signal on inhibit input of inhibit gate 51 thereby coupling clock 52 to utilization circuit 53.

In a correlation type sounder a large time bandwidth product signal is used. This enables the input filter to be based on the signal bandwidth and the output filter to be approximately equal to the reciprocal of the signal duration. The result of this is a low value for fluctuation noise. However, the use of an output filter matched to the pulse length implies that the maximum output is only available at the trailing edge of the pulse. This is illustrated in the waveforms shown in FIG. 4B where there is no side lobe gated output at the coincidence of the replica correlator output and BDI outputs. However, there is a gated output upon there being a replica correlator output and a BDI output less than the threshold value.

SUMMARY

This invention rests on the proposition that the desired main lobe response will occur at a predetermined bearing angle with reference to a local normal. This will assist in discriminating between main lobe and side lobe responses when using a depth sounder to measure ocean bottom slopes. The fact that a narrow main lobe beamwidth improves resolution does not eliminate the effect of side lobes. However, by excluding all signal responses on the basis of an inappropriate bearing angle only those responses occurring substantially normal to the depth sounder will be measured with respect to time.

I claim:
1. In combination:
a plurality of directional signal radiating devices;
each of said devices having a radiation pattern including a main lobe and a plurality of side lobes;
said devices being oriented such that at least portions of the main lobes and of side lobes of said devices overlap;
means coupled to said devices for deriving output signals from said main lobe patterns of said devices, said deriving means including means for correlating signals of said main lobe patterns with a replica for providing said output signals; and
means responsive to signals derived from overlapping side lobes of said devices for controlling said output signals derived from said main lobes, said controlling means including means for phase shifting signals obtained from one of said side lobe patterns relative to signals obtained from a second of said side lobe patterns, means for correlating said phase shifted signals of said first side lobe pattern with the signals of said second side lobe pattern, means coupled to said correlating side lobe means for integrating successive results of said correlation of said side lobe signals, and means resettable by a transmitter of signals to be received by said radiating devices for gating out signals provided by said replica correlator means when the output of said integrator exceeds a predetermined threshold value.

2. The combination in accordance with claim 1 further comprising a movable vehicle for carrying said radiating device, and a stabilizing device mounted on said movable vehicle for stabilizing said radiating device as it is carried over a terrain, the output of said integrator varying with changes in said terrain.

3. The combination in accordance with claim 1 wherein said controlling means comprises means for determining the relative phase of the signals derived from said side lobes.

4. The combination in accordance with claim 3 wherein said radiating device comprises beam stabilizing and beam forming means.

5. The combination in accordance with claim 4 wherein said control means comprises phase detecting means for detecting the relative phase of two signals derived from said beam forming means.

6. The combination in accordance with claim 1 wherein said radiating device comprises means for radiating compressional wave signals.

7. The combination in accordance with claim 6 wherein said radiating device comprises means for radiating compressional wave signals through a liquid.

8. The combination in accordance with claim 7 further comprising a display unit coupled via said gating means to the signal output from said radiating means, said display unit including a counter which is reset by the resetting of said gating means by said transmitter, the counting of said counter being terminated in response to the presence of a signal from said replica correlating means.

9. A depth sounder comprising:
means for acoustically illuminating the ocean bottom with a narrow transmission beam substantially normal to the plane of the ocean surface;
means for extracting acoustic echo signals out of noise, said means including a split beam receiving array having a pair of receiving apertures each of which being sufficiently wide in beam width to encompass at least one side lobe of a received beam, said split beam array spatially separating the phase centers of each receiving beam;
means for generating a signal magnitude proportional to the phase difference between echo signal arrivals at the two spatially separated phase centers;
means for gating through extracted acoustic signals when the phase difference signal magnitude is less than a predetermined magnitude; and
means for measuring the time of arrival of gated through extracted acoustic signals.

* * * * *